(12) United States Patent  
Wang et al.

(10) Patent No.: US 9,105,932 B2  
(45) Date of Patent: *Aug. 11, 2015

(54) LITHIUM ION BATTERY (71) Applicants: Tsinghua University, Beijing (CN); HON HAI PRECISION INDUSTRY CO., LTD., New Taipei (TW)

(72) Inventors: Jia-Ping Wang, Beijing (CN); Ke Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/308,424

(22) Filed: Jun. 18, 2014

(65) Prior Publication Data

US 2014/0302375 A1    Oct. 9, 2014

Related U.S. Application Data (63) Continuation of application No. 13/458,482, filed on Apr. 27, 2012, now Pat. No. 8,822,059.

(30) Foreign Application Priority Data

Dec. 28, 2011    (CN) .......... 2011 1 04468017

(51) Int. Cl.  
H01M 6/42      (2006.01)  
H01M 4/66      (2006.01)  
H01M 10/0525   (2010.01)  
H01M 4/64      (2006.01)

(52) U.S. Cl.  
CPC .......... H01M 4/663 (2013.01); H01M 10/0525 (2013.01); H01M 4/64 (2013.01); Y02E 60/122 (2013.01)

(58) Field of Classification Search  
CPC ................................ H01M 4/64; H01M 4/663  
USPC ........................................... 429/156  
See application file for complete search history.

(56) References Cited

U.S. PATENT DOCUMENTS

| 8,252,069 | B2  |   | 8/2012  | Feng et al.      |         |
|-----------|-----|---|---------|------------------|---------|
| 8,597,832 | B2  | * | 12/2013 | Deromelaere et al. | 429/231.5 |
| 2010/0323246 | A1 | * | 12/2010 | Feng et al.    | 429/232 |
| 2011/0097512 | A1 | * | 4/2011  | Zhou et al.    | 427/545 |
| 2012/0315539 | A1 | * | 12/2012 | Lashmore et al. | 429/211 |
| 2013/0323571 | A1 |   | 12/2013 | Dai et al.     |         |

FOREIGN PATENT DOCUMENTS

| CN | 101420021 | 4/2009 |
| CN | 102047488 | 5/2011 |
| CN | 102124599 | 7/2011 |

* cited by examiner

Primary Examiner — Jane Rhee  
(74) Attorney, Agent, or Firm — Novak Druce Connolly Bove + Quigg LLP (57) ABSTRACT A lithium ion battery includes at least one battery cell. The battery cell includes a cathode electrode, an anode electrode, and a separator. The separator is sandwiched between the cathode electrode and the anode electrode. At least one of the cathode electrode and the anode electrode includes a current collector. The current collector is a carbon nanotube layer consisting of a plurality of carbon nanotubes.

9 Claims, 8 Drawing Sheets

LITHIUM ION BATTERY

RELATED APPLICATIONS

This application is a continuation application of U.S. patent application Ser. No. 13/458,482, filed on Apr. 27, 2012, entitled "LITHIUM ION BATTERY," which claims all benefits accruing under 35 U.S.C. §119 from China Patent Application No. 201110446801.7, filed on Dec. 28, 2011, in the China Intellectual Property Office, the disclosure of which is incorporated herein by reference.

BACKGROUND

1. Technical Field

The present disclosure relates to lithium ion batteries.

2. Description of Related Art

A lithium ion battery includes a case, an anode, a cathode, a non-aqueous electrolyte, and a separator. The anode, cathode, non-aqueous electrolyte, and separator are encapsulated in the case. The separator is located between the anode and the cathode. The anode, cathode, and separator are infiltrated by the non-aqueous electrolyte. The cathode includes a cathode current collector and a cathode material layer disposed on a surface of the cathode current collector. The anode includes an anode current collector and an anode material layer disposed on a surface of the anode current collector.

The current collector is used to collect the charge generated by the lithium ion battery during discharge, and to connect to an external power source during the recharging of the lithium ion battery. The current collectors are usually made of metal foils, such as copper foil and aluminum foil. However, the metal foils have a relatively large weight. The power density is calculated by power/weight. Therefore, a large weight of the current collector will decrease the power density of a lithium ion battery. Furthermore, the metal foils may be corroded by the electrolyte, which decreases the life span of the lithium ion battery.

What is needed, therefore, is to provide a lithium ion battery having high power density and long life.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
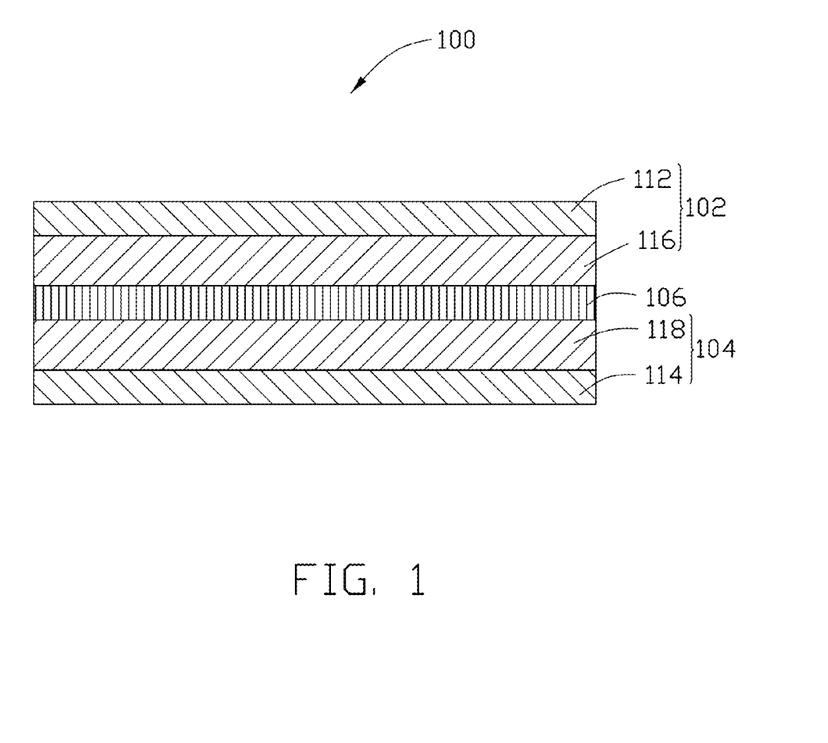
FIG. 1 is a schematic side view of an embodiment of a lithium ion battery.

Referring to FIG. 1, an embodiment of a lithium ion battery 100 includes a cathode electrode 102, an anode electrode 104, a separator 106, an electrolyte solution, and an external encapsulating shell (not shown). The cathode electrode 102, the anode electrode 104, the separator 106, and the electrolyte solution are encapsulated in the encapsulating shell. The cathode electrode 102 and the anode electrode 104 are stacked with each other and sandwiches the separator 106. The cathode electrode 102 and the anode electrode 104 can be in contact with the separator 106. The cathode electrode 102, the separator 106, and the anode electrode 104 form a battery cell. The lithium ion battery 100 includes at least one battery cell. If the lithium ion battery 100 includes a plurality of battery cells, the plurality of battery cells are stacked together. Adjacent battery cells are separated by a separator 106. In the embodiment according to FIG. 1, the lithium ion battery 100 includes one battery cell.

The cathode electrode 102 includes a cathode current collector 112 and a cathode material layer 116 disposed on at least one surface of the cathode current collector 112. The cathode current collector 112 and the cathode material layer 116 can be two separate layers. The anode electrode 104 includes an anode current collector 114 and an anode material layer 118 disposed on at least one surface of the anode current collector 114. The anode current collector 114 and the anode material layer 118 can be two separate layers. In one embodiment, the cathode electrode 102 includes two cathode material layers 116 and one cathode current collector 112 sandwiched between the two cathode material layers 116, and the anode electrode 104 includes two anode material layers 118 and one anode current collector 114 sandwiched between the two anode material layers 118. If the lithium ion battery 100 includes a plurality of battery cells, in every two adjacent battery cells, the cathode material layer 116 in one battery cell and the anode material layer 118 in the other battery cell face each other and sandwiches the separator 106 therebetween.

The cathode electrode 102 can further include a conducting tab 20 (see FIG. 3) electrically connected with the cathode current collector 112. The anode electrode 104 can further include a conducting tab 20 electrically connected with the anode current collector 114. A material of the conducting tab 20 can be metal. After the conducting tab 20 electrically connects with the cathode current collector 112 or the anode current collector 114, a protecting layer can be coated on surfaces of the conducting tab 20 to protect the conducting tab 20 from being corroded by the electrolyte solution. A material of the protecting layer can be a polymer. The conducting tab 20 is configured to connect the cathode current collector 112 or the anode current collector 114 with outside.

At least one of the cathode current collector 112 and the anode current collector 114 is a carbon nanotube layer. In one embodiment, both the cathode current collector 112 and the anode current collector 114 are carbon nanotube layers. The carbon nanotube layer includes a plurality of carbon nanotubes uniformly distributed therein. The carbon nanotubes in the carbon nanotube layer can be combined with each other by van der Waals attractive force therebetween. The carbon nanotubes can be disorderly or orderly arranged in the carbon nanotube layer. The term 'disorderly' describes the carbon nanotubes being arranged along many different directions, such that the number of carbon nanotubes arranged along each different direction can be almost the same (e.g. uniformly disordered), and/or entangled with each other. The term 'orderly' describes the carbon nanotubes being arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube layer can be single-walled, double-walled, or multi-walled carbon nanotubes. The thickness of the carbon nanotube layer is not limited, and can be in a range from about 0.5 nanometers to about 1 centimeter. In one embodiment, the thickness of the carbon nanotube layer is in a range from about 1 micrometer to about 1 millimeter. The carbon nanotube layer can include at least one carbon nanotube film. In the carbon nanotube layer, more than one carbon nanotube film can be stacked together.

Figure 2:
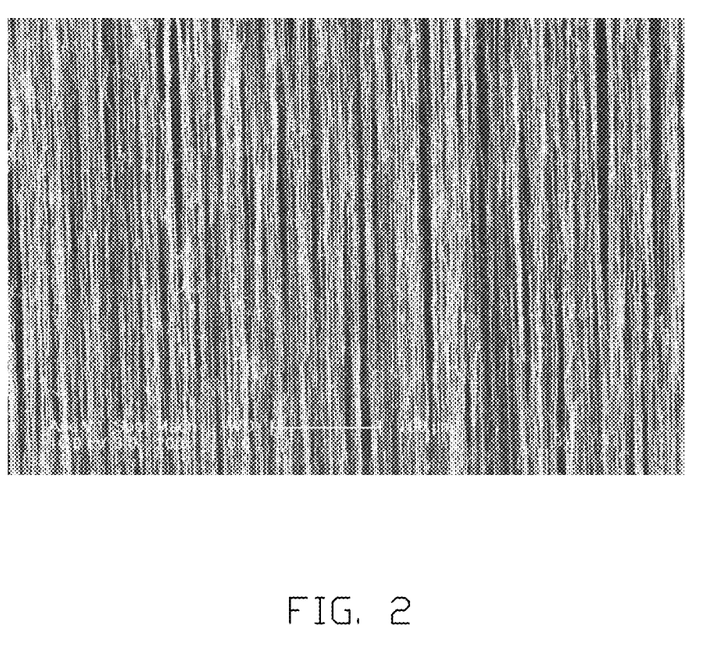
FIG. 2 is a scanning electron microscope (SEM) photo of an embodiment of a drawn carbon nanotube film used in the current collector.

Referring to FIG. 2, in one embodiment, the carbon nanotube layer can include at least one drawn carbon nanotube film. The drawn carbon nanotube film includes a plurality of successive and oriented carbon nanotubes joined end-to-end by van der Waals attractive force therebetween. The carbon nanotubes in the carbon nanotube film can be substantially aligned in a single direction. The drawn carbon nanotube film can be formed by drawing a film from a carbon nanotube array that is capable of having a film drawn therefrom. The plurality of carbon nanotubes in the drawn carbon nanotube film are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. The drawn carbon nanotube film is capable of forming a free-standing structure. The term "free-standing structure" includes, but is not limited to, a structure that does not have to be supported by a substrate. For example, a free-standing structure can sustain the weight of itself when it is hoisted by a portion thereof without any significant damage to its structural integrity. So, if the drawn carbon nanotube film is placed between two separate supporters, a portion of the drawn carbon nanotube film, not in contact with the two supporters, would be suspended between the two supporters and yet maintain film structural integrity. The free-standing structure of the drawn carbon nanotube film is realized by the successive carbon nanotubes joined end to end by van der Waals attractive force.

It can be appreciated that some variations can occur in the orientation of the carbon nanotubes in the drawn carbon nanotube film as can be seen in FIG. 2. Microscopically, the carbon nanotubes oriented substantially along the same direction may not be perfectly aligned in a straight line, and some curve portions may exist. It can be understood that a contact between some carbon nanotubes located substantially side by side and oriented along the same direction can not be totally excluded. More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity and shape. The carbon nanotubes in the drawn carbon nanotube film are also substantially oriented along a preferred orientation. The drawn carbon nanotube film can be a pure structure only including the carbon nanotubes. The thickness of the drawn carbon nanotube film can be in a range from about 0.5 nanometers to about 100 micrometers. The width and length of the drawn carbon nanotube film is not limited. When the carbon nanotube layer includes a plurality of drawn carbon nanotube films, an angle between the aligned directions of the carbon nanotubes in at least two drawn carbon nanotube films can be in a range from about 0 degrees to about 90 degrees, for example can be equal to about 0 degrees, 15 degrees, 45 degrees, 60 degrees, or 90 degrees.

In another embodiment, the carbon nanotube layer can include at least one flocculated carbon nanotube film formed by a flocculating method. The flocculated carbon nanotube film can include a plurality of long, curved, disordered carbon nanotubes entangled with each other. The length of the carbon nanotube film can be above 10 centimeters. The carbon nanotubes can be randomly arranged and curved in the flocculated carbon nanotube film. The carbon nanotubes can be substantially uniformly distributed in the flocculated carbon nanotube film. The adjacent carbon nanotubes are acted upon by the van der Waals attractive force therebetween, thereby forming an entangled structure with micropores defined therein. Due to the carbon nanotubes in the flocculated carbon nanotube film being entangled with each other, the flocculated carbon nanotube film has excellent durability, and can be fashioned into desired shapes with a low risk to the integrity of flocculated carbon nanotube film. The flocculated carbon nanotube film can be a free-standing structure due to the carbon nanotubes being entangled and adhered together by van der Waals attractive force therebetween. The thickness of the flocculated carbon nanotube film can range from about 1 micrometer to about 1 millimeter. It is also understood that many of the embodiments of the carbon nanotube structure are flexible and do not require the use of a structural support to maintain their structural integrity. The flocculated carbon nanotube film can be a pure carbon nanotube film only including carbon nanotubes.

In another embodiment, the carbon nanotube layer can include at least one pressed carbon nanotube film. The pressed carbon nanotube film can be formed by pressing a carbon nanotube array to slant the carbon nanotubes in the carbon nanotube array. The pressed carbon nanotube film can be a free-standing carbon nanotube film. The carbon nanotubes in the pressed carbon nanotube film are arranged along a same direction, along more than one predetermined different directions, or randomly arranged. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to approximately 15 degrees. In some embodiment, the angle is greater than 0 degrees less than 15 degrees. The greater the pressure applied, the smaller the angle obtained. The thickness of the pressed carbon nanotube film can be in a range from about 1 micrometer to about 1 millimeter. The pressed carbon nanotube film can be pure carbon nanotube film only including carbon nanotubes. The length and width of the pressed carbon nanotube film depend on the carbon nanotube array that is pressed. If the length and width of the carbon nanotube array is relatively large, the pressed carbon nanotube film can have relatively large length and width.

Figure 3:
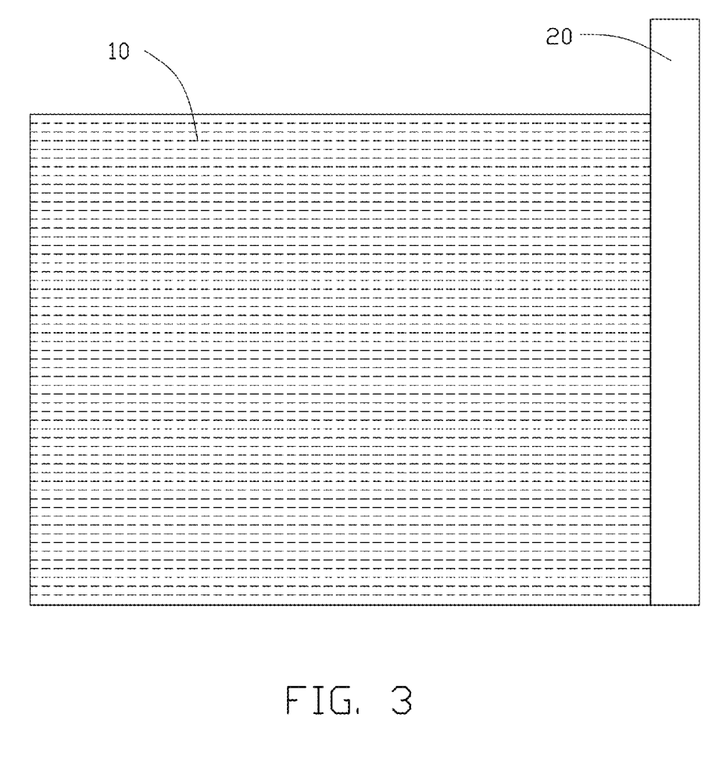
FIG. 3 is a schematic top view of an embodiment of a current collector.

If the cathode current collector 112 or the anode current collector 114 is the carbon nanotube layer, the conducting tab 20 can be electrically connected to the carbon nanotube layer by many methods. Referring to FIG. 3, in one embodiment, the carbon nanotubes in the carbon nanotube layer 10 are aligned along the same direction, the conducting tab 20 can have a strip shape, and the conducting tab 20 can be arranged on the surface of the carbon nanotube layer 10 at one side of the carbon nanotube layer 10. The conducting tab 20 can be overlapped on the side of the carbon nanotube layer 10. The length direction of the strip shaped conducting tab 20 can be substantially perpendicular to the aligned direction of the carbon nanotubes in the carbon nanotube layer 10. The carbon nanotubes have superior conductivity along the axial direction. Therefore, in this arranged manner, the charges in the carbon nanotube layer 10 can be rapidly conducted to the conducting tab 20. The conducting tab 20 can have a line shaped contact and connection area with the carbon nanotube layer 10.

Figure 4:
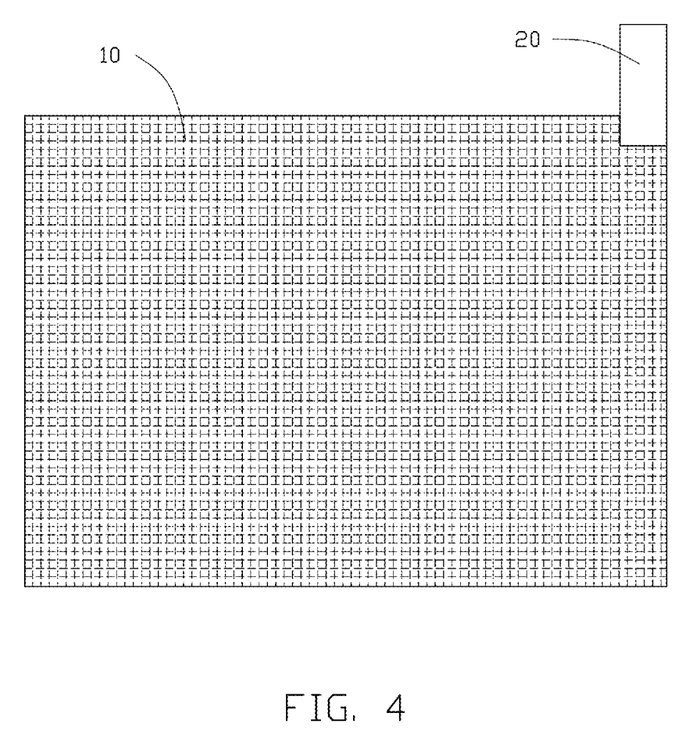
FIG. 4 is a schematic top view of another embodiment of a current collector.

Referring to FIG. 4, in another embodiment, the carbon nanotubes are disorderly arranged or intercrossed with each other in the carbon nanotube layer 10 to form a conducting network. The conducting tab 20 can have a strip shape and only has an end of the strip in contact with the carbon nanotube layer 10. The conducting tab 20 can be electrically connected to the carbon nanotube layer 10 through a point contact. In one embodiment, the carbon nanotube layer 10 includes at least two stacked drawn carbon nanotube films. The carbon nanotubes in the two drawn carbon nanotube films are substantially perpendicular to each other. The carbon nanotubes in the two drawn carbon nanotube films can be respectively parallel to the two perpendicular edges of the carbon nanotube layer 10. The conducting tab 20 can be arranged at the corner of the carbon nanotube layer 10 formed by the two perpendicular edges.

The cathode material layer 116 can include cathode active material, conductive agent, and adhesive. The cathode active material can be lithium manganate ($LiMn_2O_4$), lithium cobalt oxide ($LiCoO_2$), lithium nickel oxide ($LiNiO_2$) or lithium iron phosphate ($LiFePO_4$). The conductive agent can be acetylene black, carbon fiber or carbon nanotube. The adhesive can be polyvinylidene fluoride (PVDF) or polytetrafluoroethylene (PTFE). A thickness of the cathode material layer 116 can be in a range from about 100 micrometers to about 300 micrometer. In one embodiment, the thickness of the cathode material layer 116 is about 200 micrometers.

Figure 5:
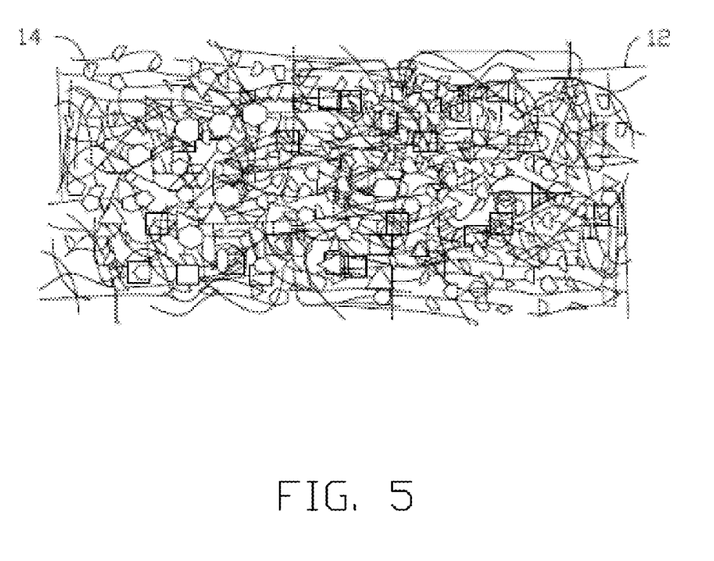
FIG. 5 is a structural schematic view of a lithium ion battery cathode.
Figure 6:
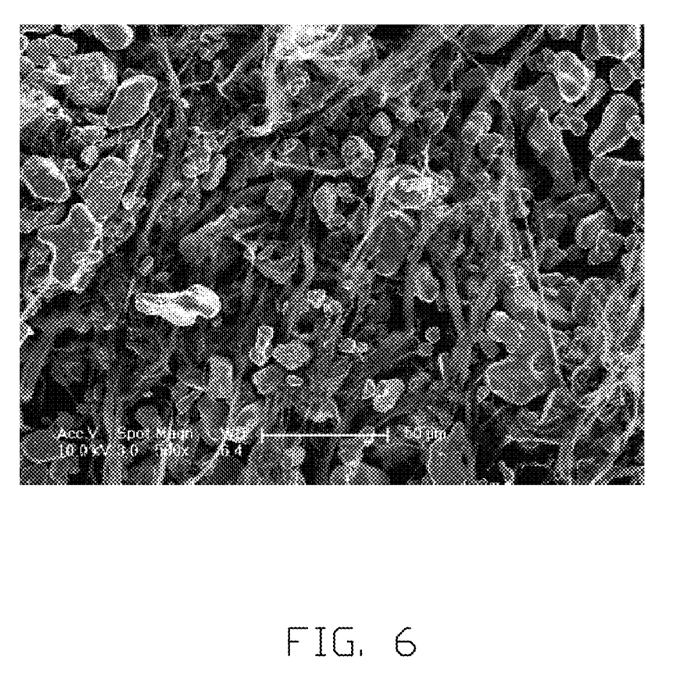
FIG. 6 is an SEM image of one embodiment of a lithium ion battery cathode.

In another embodiment, the cathode material layer 116 consists of cathode active material and carbon nanotubes, e.g., the cathode material layer 116 is free of adhesive. The cathode material layer 116 can further include acetylene black, carbon fiber, or any other conductive agent. In the embodiment according to FIGS. 5 and 6, the cathode material layer 116 only includes cathode active material particles 14 and carbon nanotubes 12. A shape of the cathode active material particles 14 is not limited, and can be irregular or regular. A diameter of the cathode active material particles 14 is not limited, and can be less than 15 micrometer. Referring to FIG. 5, in one embodiment, the cathode active material particles 14 can be lithium cobalt oxide particles having a diameter less than 15 micrometer. The carbon nanotubes 12 are entangled with each other and combined by van der Waals attractive force therebetween, thereby forming an integral continuous net structure having a plurality of micropores defined by the carbon nanotubes 12. The plurality of cathode active material particles 14 are dispersed in the net like structure and attached on the surface of the carbon nanotubes 12. The carbon nanotube 12 is pure, and has no impurities adhered thereon. The carbon nanotubes 12 in the cathode electrode 102 can serve as a conductive material and microporous carrier to support and fix the cathode active material particles 14. Thus, even without using an adhesive, the cathode electrode 102 can be an integrative stable structure due to the net structure composed of the carbon nanotubes 12. The cathode active material particles 14 are uniformly distributed in the net structure. Specifically, the cathode active material particles 14 can be adhered on or entangled by the carbon naotubes, or the cathode active material particles 14 can be wrapped by the carbon nanotubes. The cathode active material particles 14 and the carbon nanotubes are in contact with each other without adhesive therebetween. The cathode active material particles 14 and the carbon nanotubes are fixed together by van der Waals attractive force therebetween. A length of the carbon nanotubes can be longer than 200 micrometer, and the carbon nanotubes can be entangled with each other to form the net structure. As such, the cathode active material particles 14 can be fixed by the net structure, and the cathode material layer 116 is free of adhesive.

The anode material layer 118 can include anode active material, conductive agent, and adhesive. The anode active material can be natural graphite, pyrolysis carbon, or mesocarbon microbeads (MCMB). The conductive agent can be acetylene black, carbon fiber, or carbon nanotube. The adhesive can be PVDF or PTFE. A thickness of the anode material layer 118 can be in a range from about 50 micrometers to about 200 micrometers. In one embodiment, the thickness of the anode material layer 118 is about 100 micrometers.

In another embodiment, the anode material layer 118 consists of anode active material and carbon nanotubes, e.g., the anode material layer 118 is free of adhesive. The anode material layer 118 can further include acetylene black, carbon fiber, or any other conductive agent. In one embodiment, the anode material layer 116 only includes anode active material particles and carbon nanotubes. A shape of the anode active material particles is not limited, and can be irregular or regular. A diameter of the anode active material particles is not limited, and can be less than 15 micrometer. The carbon nanotubes are entangled with each other and combined by van der Waals attractive force therebetween, thereby forming an integral continuous net structure having a plurality of micropores defined by the carbon nanotubes. The plurality of anode active material particles are dispersed in the net like structure and attached on the surface of the carbon nanotubes. The anode active material particles are uniformly distributed in the net structure. Specifically, the anode active material particles can be adhered on or entangled by the carbon nanotubes, or the anode active material particles can be wrapped by the carbon nanotubes. Thus, even without using adhesive, the anode material layer 118 can be an integrative stable structure due to the net structure composed of the carbon nanotubes, and the anode material layer 116 is free of adhesive.

The separator 106 can be similar to a conventional separator, such as a microporous polymer film, a microporous ceramic film, or combination thereof. A thickness of the separator 106 can be in a range from about 5 micrometer to about 60 micrometer. In some embodiments, the thickness of the separator 106 is in a range from about 15 micrometer to about 40 micrometer. The separator 106 includes a number of pores. A porous rate of the separator 106 can be in a range from about 20% to about 90%, diameters of the pores of the separator 106 is in a range from about 0.1 micrometer to about 80 micrometer. In some embodiments, the porous rate is in a range from about 40% to 80%, diameter is in a range from about 0.1 micrometer to about 10 micrometer. The electrolyte solution can include an electrolyte and an organic solvent. The electrolyte can be lithium hexafluorophosphate ($LiPF_6$), lithium terafluoroborate ($LiBF_4$), lithium bis(oxalato)borate (LiBOB), or combinations thereof. The organic solvent can be ethylene carbonate (EC), diethyl carbonate (DEC), dimethyl carbonate (DMC), ethylmethyl carbonate (EMC), propylene carbonate (PC), or combinations thereof.

The external encapsulating shell can be a rigid battery shell or a soft encapsulating bag. The conductive tabs are exposed to outside of the external encapsulating shell, thereby connecting the external circuit.

The carbon nanotube layer used as the cathode current collector 112 and/or the anode current collector 114, has relatively good conductivity, stable chemical and electrical stability, and low weight. Therefore, the cathode current collector 112 and/or the anode current collector 114 can have a low weight, and the current collector does not corrode easily, and thus has a relatively long lifespan. As such, the lithium ion battery 100 has a high power density and long lifespan.

Figure 7:
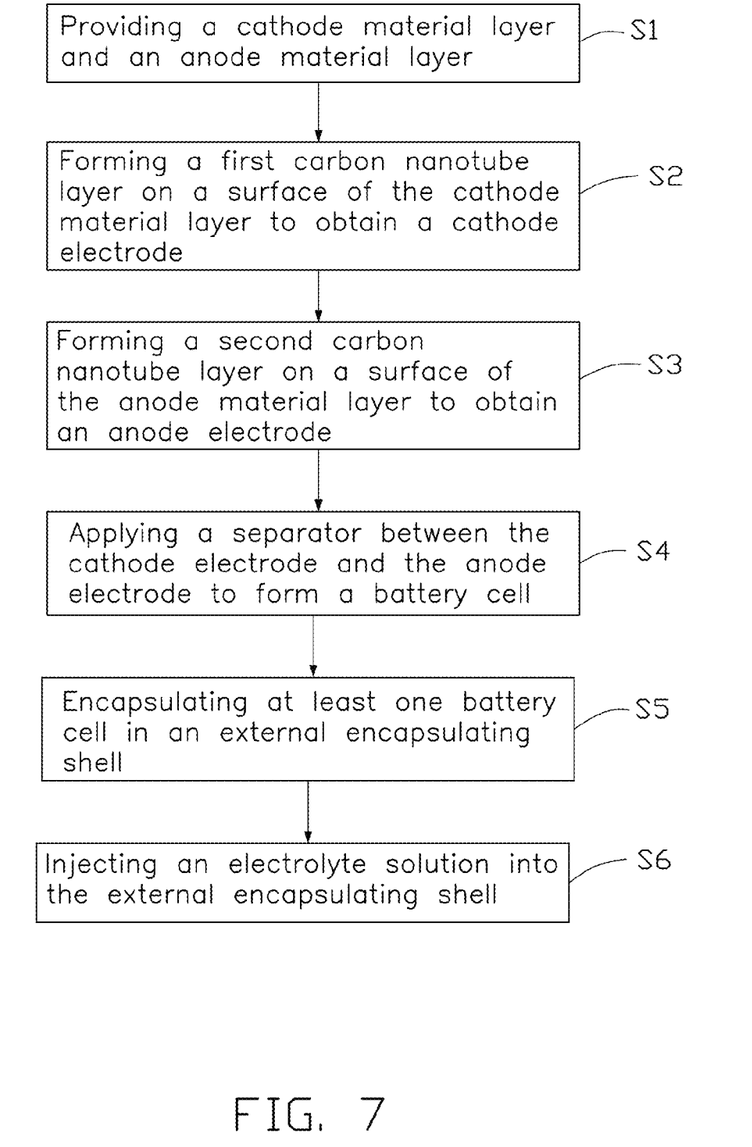
FIG. 7 is a flowchart for making a lithium ion battery according to one embodiment.

Referring to FIG. 7, a method for making a lithium ion battery is provided. The method includes the following steps:

S1: providing a cathode material layer and an anode material layer;

S2: forming a first carbon nanotube layer on a surface of the cathode material layer to obtain a cathode electrode;

S3: forming a second carbon nanotube layer on a surface of the anode material layer to obtain an anode electrode; and S4: applying a separator between the cathode electrode and the anode electrode, thereby forming a battery cell;

S5: encapsulating at least one battery cell in an external encapsulating shell; and S6: injecting an electrolyte solution into the external encapsulating shell.

In step S1, a method for making the cathode material layer is not limited. In one embodiment, the cathode material layer is formed by the following sub-steps:

S11: making a carbon nanotube source including a number of carbon nanotubes;

S12: providing a cathode active material including a number of cathode active material particles and a solvent;

S13: adding the carbon nanotube source and the cathode active material into the solvent, and shaking the solvent with the carbon nanotube source and the cathode active material with ultrasonic waves; and S14: separating the carbon nanotube source and the cathode active material from the solvent to obtain the cathode material layer.

In step S11, the carbon nanotube source can be made of carbon nanotubes. The carbon nanotubes can be single-walled carbon nanotubes, double-walled carbon nanotubes, or multi-walled carbon nanotubes. The carbon nanotubes can be pure, meaning there is few or no impurities adhered on surface of the carbon nanotubes. In some embodiments, there are no functional groups attached on the carbon nanotubes. A length of the carbon nanotubes can be the same or different. The length of the carbon nanotubes can be longer than 300 micrometers. In one embodiment, the lengths of the carbon nanotubes are substantially the same. A method for making the carbon nanotube source can include providing a carbon nanotube array, wherein the carbon nanotube array can be formed on a substrate, and scratching the carbon nanotube array from the substrate to form the carbon nanotube source. The carbon nanotube source obtained directly from the carbon nanotube array can make the lithium ion battery cathode stronger. In one embodiment, the carbon nanotube array is a super aligned carbon nanotube array. A method for making the carbon nanotube array can be by CVD method, arc discharge method, aerosol method, or any other appropriate method.

In the step S12, the solvent can be ethanol, glycol, acetone, N-Methyl-2-pyrrolidone, water, or combination thereof. In one embodiment, the solvent is ethanol. The solvent is contained in a container, such as a beaker.

In the step S13, the carbon nanotube source and the cathode active material form a mixture. A weight percentage of the carbon nanotubes in the mixture can be in a range from about 0.1% to about 20%. In some embodiments, the weight percentage of the carbon nanotubes can be in a range from about 1% to about 10%. A power of the ultrasonic wave can be in a range from about 400 W to about 1500 W. In some embodiments, the power is in a range from about 800 W to about 1000 W. A time of shaking with the ultrasonic wave can range from about 2 minutes to about 30 minutes. In some embodiments, the shaking time ranges from about 5 minutes to about 10 minutes. The solvent with the carbon nanotube source and the cathode active material can be shaken with ultrasonic waves continuously or at intervals.

In step S14, after the solvent with the carbon nanotube source and the cathode active material is shaken, the carbon nanotubes in the carbon nanotube source and the cathode active material particles in the cathode active material combine with each other to form mixture. The mixture consists of the carbon nanotubes and cathode active material particles. The solvent with the mixture is kept still for about 1 minute to about 20 minutes. The mixture will deposit to a bottom of the solvent. After the solvent with the carbon nanotube source and the cathode active material is shaken, the carbon nanotubes entangled with each other to form a net structure. The cathode active material particles are wrapped by the net structure and attached on the surface of the carbon nanotubes to form an integrity mixture. The cathode active material particles have a larger density than the solvent, and as such, the integrity mixture can be deposited to the bottom of the solvent. After the mixture has deposited to the bottom of the solvent, the solvent can be absorbed from the container by a pipe, thereby separating the mixture from the solvent. After the carbon nanotube source and the cathode active material are separated from the solvent, the mixture of the carbon nanotube source and the cathode active material can be dried at a room temperature or at a temperature from about 25 centigrade to about 80 centigrade. After the mixture is dried, the mixture can be cut directly to form the lithium ion battery cathode. In other embodiments, the mixture can be pressed and then cut to form the lithium ion battery cathode. The cathode material layer made by the above method only consists of carbon nanotubes and cathode active material particles.

In step S1, a method for making the anode material layer is not limited. In one embodiment, the method for making the anode material layer is almost the same as the method for making the cathode material layer, just using anode active material instead of cathode active material. The anode material layer made by the above method only consists of carbon nanotubes and anode active material particles.

In step S2, the first carbon nanotube layer has the same structure with the carbon nanotube layer disclosed above. The first carbon nanotube layer includes at least one of the drawn carbon nanotube film, the flocculated carbon nanotube film, and/or the pressed carbon nanotube film. After the drawn carbon nanotube film, the flocculated carbon nanotube film, or the pressed carbon nanotube film is formed, it can be laid directly on the surface of the cathode material layer. In one embodiment, the first carbon nanotube layer is one pressed carbon nanotube film. The first carbon nanotube film is formed on the surface of the cathode material layer by the following sub-steps: S21: proving a carbon nanotube array; S22: transferring the carbon nanotube array to the surface of the cathode material layer; and S23: pressing the carbon nanotube array.

In step S21, the method for making the carbon nanotube array is not limited. In one embodiment, the carbon nanotube array is formed on a substrate by CVD method.

In the step S22, the carbon nanotube array is transferred on the surface of the cathode material layer by covering the substrate with the carbon nanotube array on the surface of the cathode material layer, wherein the carbon nanotube array is sandwiched between the substrate and the cathode material layer.

In the step S23, a pressure can be applied on the substrate to press the carbon nanotube array onto the surface of the cathode material layer. The substrate can be separated from the carbon nanotube array, and at least part of carbon nanotubes in the carbon nanotube array stays on the surface of the cathode material layer to form the first carbon nanotube layer. The substrate can be separated from the carbon nanotube array by applying a thin sheet between the carbon nanotube array and the substrate, and then removing the substrate with the carbon nanotube array reamining on the surface of the cathode material layer to form the first carbon nanotube layer. After the substrate is removed, the carbon nanotube array remaining on the surface of the cathode material layer can be further pressed.

In step S3, the method of forming the second carbon nanotube layer on the surface of the anode material layer is the same as forming the first carbon nanotube layer on the cathode material layer. The second carbon nanotube layer can have the same structure as the first carbon nanotube layer.

The above step S4 can further includes the sub-step of pressing the battery cell using a laminator.

Figure 8:
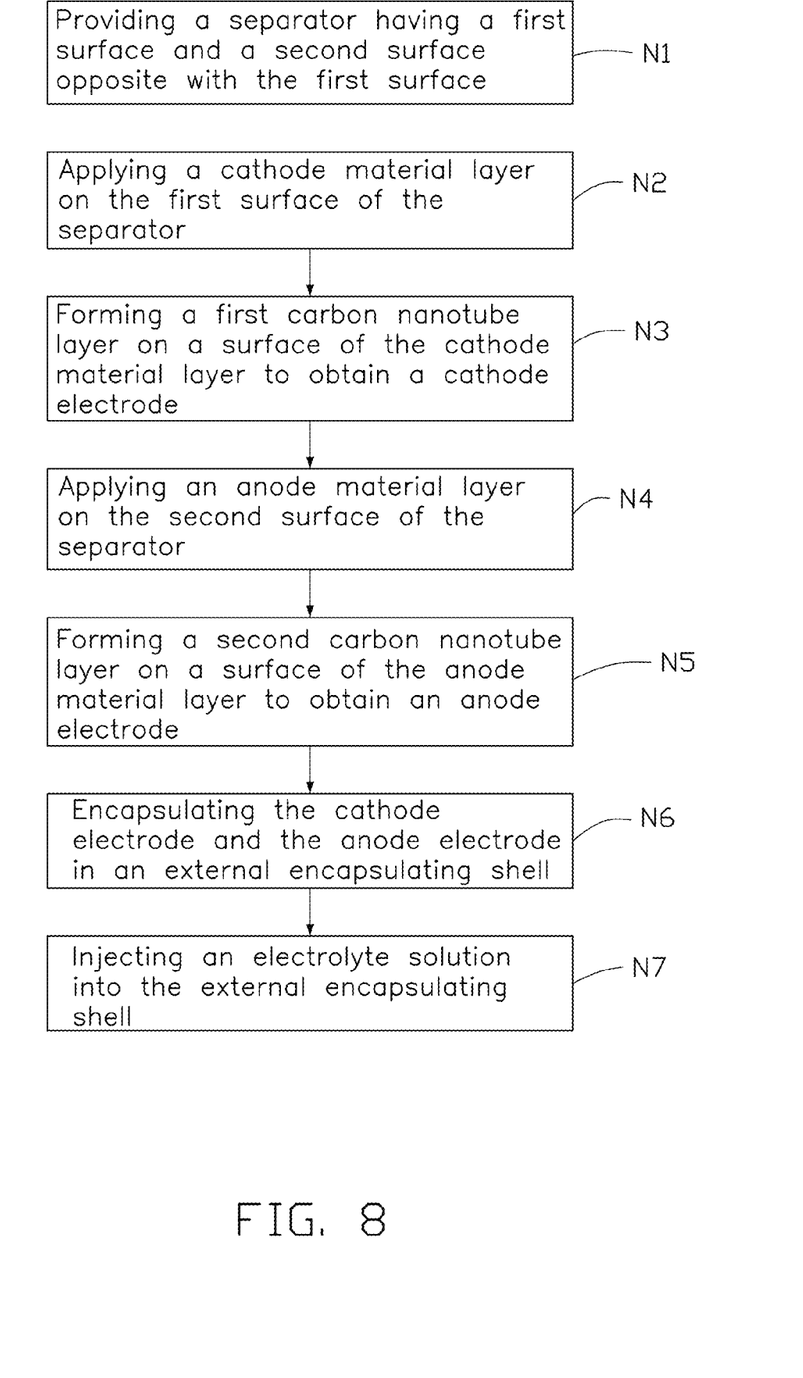
FIG. 8 is a flowchart for making a lithium ion battery according to another embodiment.

Referring to FIG. 8, another embodiment of making the lithium ion battery includes the following steps:

N1: providing a separator having a first surface and a second surface opposite the first surface;

N2: applying a cathode material layer on the first surface of the separator;

N3: forming a first carbon nanotube layer on a surface of the cathode material layer to obtain a cathode electrode;

N4: applying an anode material layer on the second surface of the separator;

N5: forming a second carbon nanotube layer on a surface of the anode material layer to obtain an anode electrode; and N6: encapsulating the cathode electrode and the anode electrode in an external encapsulating shell; and N7: injecting an electrolyte solution into the external encapsulating shell.

In one embodiment, Step N2 includes the following sub-steps: providing slurry including cathode active material, conductive agent and adhesive; and applying the slurry on the first surface of the separator by a coating method or spinning method. In other embodiments, the method for making the cathode material layer can be the same as step S1 disclosed above.

Step N3 is almost the same as step S2 disclosed above. In one embodiment, after the slurry is applied on the surface of the first surface of the separator, the first carbon nanotube layer can be formed on the surface of the cathode material layer after the slurry is solidified or before the slurry is solidified. In one embodiment, the first carbon nanotube layer is formed on the surface of the cathode material layer before the slurry is solidified, and then the slurry is solidified, so that the first carbon nanotube layer can combine with the cathode material layer tightly.

In one embodiment, Step N4 is almost the same as step N2, but using anode active material instead of cathode active material. In another embodiment, the anode material layer is formed on the second surface of the separator by coating slurry including anode active material, conductive agent, and adhesive on the second surface.

Step N5 is almost the same as step N3. The second carbon nanotube layer can have the same structure with the first carbon nanotube layer.

Step N6 is the same as step S5 disclosed above.

Step N7 is the same as step S6 disclosed above.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A lithium ion battery comprising at least one battery cell, the at least one battery cell comprising:
   a cathode electrode;
   an anode electrode; and
   a separator located between the cathode electrode and the anode electrode;
   wherein the cathode electrode comprises a current collector and two cathode material layers, the current collector is a carbon nanotube layer sandwiched between the two cathode material layers and consisting of a plurality of first carbon nanotubes, and each of the two cathode material layers is a continuous layer structure with a thickness in a range from about 100 micrometers to about 300 micrometer.

2. The lithium ion battery of claim 1, wherein the plurality of first carbon nanotubes are uniformly distributed and substantially aligned along a same direction.

3. The lithium ion battery of claim 1, wherein the carbon nanotube layer comprises a plurality of stacked carbon nanotube films, the plurality of first carbon nanotubes in each of the plurality of stacked carbon nanotube films are aligned along the same direction, and the plurality of first carbon nanotubes in at least two of the plurality of stacked carbon nanotube films are substantially perpendicular to each other.

4. The lithium ion battery of claim 1, wherein the plurality of first carbon nanotubes in the carbon nanotube layer are entangled with each other and randomly dispersed.

5. The lithium ion battery of claim 1, wherein the carbon nanotube layer comprises a surface, and an angle between a primary alignment direction of the plurality of first carbon nanotubes and the surface of the carbon nanotube layer is greater than 0 degrees and less than 15 degrees.

6. The lithium ion battery of claim 1, wherein each of the two cathode material layers consists of a plurality of cathode active material particles and a plurality of second carbon nanotubes.

7. The lithium ion battery of claim 1, wherein the anode electrode comprises an anode material layer and the carbon nanotube layer stacked with each other.

8. The lithium ion battery of claim 7, wherein the anode material layer consists of a plurality of anode active material particles and a plurality of third carbon nanotubes.

9. The lithium ion battery of claim 1, wherein the at least one battery cell comprises a plurality of battery cells stacked with each other.

\* \* \* \* \*